(12) United States Patent
Suau et al.

(10) Patent No.: US 8,785,578 B2
(45) Date of Patent: *Jul. 22, 2014

(54) PAPER COATINGS OF AMPHIPHILIC, NON-WATER-SOLUBLE COMB-BRANCHED (METH)ACRYLIC POLYMERS, USES THEREOF

(75) Inventors: Jean-Marc Suau, Lucenay (FR); Murielle Guillot, Caluire et Cuire (FR)

(73) Assignee: Coatex, Genay (FR)

( * ) Notice: Subject to any disclaimer, the term of this patent is extended or adjusted under 35 U.S.C. 154(b) by 135 days.

This patent is subject to a terminal disclaimer.

(21) Appl. No.: 13/166,903

(22) Filed: Jun. 23, 2011

(65) Prior Publication Data

US 2012/0046404 A1 Feb. 23, 2012

Related U.S. Application Data

(60) Provisional application No. 61/376,345, filed on Aug. 24, 2010.

(30) Foreign Application Priority Data

Aug. 19, 2010 (FR) ..................................... 10 56659

(51) Int. Cl.
| | | |
|---|---|---|
| C08F 4/04 | (2006.01) |
| C08F 24/00 | (2006.01) |
| C08F 124/00 | (2006.01) |
| C08F 224/00 | (2006.01) |
| C08K 3/26 | (2006.01) |
| C08K 3/34 | (2006.01) |
| C09C 1/42 | (2006.01) |
| C08J 3/22 | (2006.01) |
| C08F 222/40 | (2006.01) |
| C08L 37/00 | (2006.01) |

(52) U.S. Cl.
USPC ........... 526/219; 524/426; 524/548; 524/451; 524/447; 526/273

(58) Field of Classification Search
None
See application file for complete search history.

(56) References Cited

U.S. PATENT DOCUMENTS

| 6,093,764 A * | 7/2000 | Egraz et al. ................... 524/413 |
| 2005/0143511 A1 | 6/2005 | Suau et al. |
| 2007/0073016 A1 | 3/2007 | Alvarado et al. |
| 2009/0170982 A1 | 7/2009 | Dupont et al. |

FOREIGN PATENT DOCUMENTS

| CN | 1325911 A | 12/2001 |
| CN | 101331274 A | 12/2008 |
| WO | WO 02/070615 A1 | 9/2002 |
| WO | WO 2007/069037 A1 | 6/2007 |

OTHER PUBLICATIONS

International Search Report issued Nov. 8, 2011, in Patent Application No. PCT/IB2011/001652.
U.S. Appl. No. 13/204,758, filed Aug. 8, 2011, Suau.
Combined Chinese Office Action and Search Report issued Jan. 6, 2014 in Patent Application No. 201180039792.8 with English Translation of Category of Cited Documents.

* cited by examiner

*Primary Examiner* — Ling Choi
*Assistant Examiner* — Catherine S Branch
(74) *Attorney, Agent, or Firm* — Oblon, Spivak, McClelland, Maier & Neustadt, L.L.P.

(57) ABSTRACT

Polymers, paper coating compositions, and coated paper.

19 Claims, No Drawings

PAPER COATINGS OF AMPHIPHILIC, NON-WATER-SOLUBLE COMB-BRANCHED (METH)ACRYLIC POLYMERS, USES THEREOF

REFERENCE TO PRIOR APPLICATIONS

This application claims priority to U.S. provisional application Ser. No. 61/376,345, filed Aug. 24, 2010; and to French patent application 10 56659, filed Aug. 19, 2010, both incorporated herein by reference.

FIELD OF THE INVENTION

The present invention pertains to the field of paper and more particularly deals with certain additives sometimes known as "rheology modifiers" and "water-retaining agents." These additives are useful for example in the formulation of paper coatings, which are aqueous formulations intended to be applied to the surface of the sheet of paper.

In preferred embodiments the invention relates to the use, in paper coatings, of comb-branched non-water-soluble polymers, with a (meth)acrylic skeleton, onto which are grafted side-chains containing at least one hydrophobic monomer of the styrene or C1-C4 (meth)acrylic ester type and at least one hydroxy- or methoxy-polyalkylene glycol monomer. The monomer contents are preferably such that said polymer is amphiphilic, as it is both rich in hydrophobic monomers and in polyalkylene glycol monomers. These products, which may be used in paper coatings, make it possible to improve their Brookfield™ viscosity, decrease their ACAV viscosity, and improve their water retention, which makes them particularly well-suited for coatings with high solids contents and/or coat weight speeds. Another object of the invention concerns the paper coatings formulated in this way.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

BACKGROUND OF THE INVENTION

Within the context of manufacturing the sheet of paper through coating, an aqueous composition known as paper coating is deposited onto the surface of the substrate paper, its function being to give said sheet a certain number of properties, such as opacity, brightness, whiteness, or printability when using offset or heliography printing methods.

These formulations are made up of water, one or more mineral loads, one or more binders whether water-soluble or not, as well as various additives such as dispersing agents, water-retaining agents, optical brighteners, rheology modifiers, etc.

Within the coating's rheology, it is first and foremost important to have a product that is easy to pump and filter within the supply systems of the application process, and which has no tendency to form foam or splashes, nor excessively fast sedimentation. This requirement corresponds to increasing the low shear rate viscosity, or the Brookfield™ viscosity measured at 100 revolutions/minute and at 25° C. with the device of the same name, without which the paper coating is too liquid.

Another major rheological characteristic is the high shear rate viscosity, as expressed through a ACAV viscosity value at 25° C. measured in a capillary viscosimeter in which the coating may be subjected to high shear rates ($10^5$ at $3\times10^6$ s$^{-1}$) of the same order of magnitude as those observed during the coating method when the coating blade scraping off the excess deposited paper coating is applied. High shear rate viscosity is a determining factor in which blade pressure to apply. The greater this viscosity is, the higher the blade pressure needs to be in order to control the weight of the deposited layer.

Increasing the dry solids content of coatings and coating speeds is a trend which has been observed in recent years, as it generates economic and/or qualitative advantages. However, this increase in dry solids content leads to an increase in the shear viscosity, and consequently to a rise in the necessary blade pressures. Higher coating speeds, meanwhile, cause an increase in the hydraulic force on the blade, and therefore on the pressure to exert, which may lead to overflows of coatings, known by the terms "bleedings" or "pearls." This issue is recounted in the document WO 84/04491.

This dual requirement is joined by the need to reduce the phenomenon of water and water-soluble species migrating through the paper. This migration is sought to be reduced as much as possible, in order to prevent a rheological change in the coating left unused and recycled during the application process. This is referred to as a water retention phenomenon, which is sought to be improved, i.e. increased.

In terms of rheology modifiers and water-retaining agents, in recent years a particular class of comb-branched polymers having a (meth)acrylic skeleton with hydroxy- or methoxy-polyalkylene glycol side-chains potentially containing a hydrophobic monomer such as ethyl or butyl acrylate. These are aqueous solutions of water-soluble polymers, particularly such as those developed by the company COATEX™ through its range of Rheocarb™ products in the field of paper.

Several patents currently describe the application properties of these structures in a paper coating: WO 01/96007 A1, WO 04/044022 A1, WO 04/041883 A1, WO 07/069037 A1 and WO 08/149226 A1. These polymers may be introduced into the paper coating by means of the suspension of mineral materials whose rheology they improve (WO 01/96007 A1). Besides their ability to increase the coating's Brookfield™ viscosity, they make it possible to improve its optical whiteness (WO 04/044022 A1) and brightness (WO 04/041883 A1). They are also known for increasing not only the water-retention of the coating (WO 07/069037 A1), but also their high shear gradient viscosity (WO 08/149226 A1).

In these documents:
the hydrophobic ethyl acrylate or styrene monomer is always optional (particularly as indicated in WO 01/96007 A1, WO 04/044022 A1, WO 04/041883 A1 and WO 07/069037 A1);
whenever it is present, its concentration by weight is always less than 20% of the total weight of the monomers involved (5% by weight of ethyl acrylate in test #13 of document WO 04/044022 and 4.5% to 19.5% by weight of ethyl acrylate in tests #4 to 7 of document WO 01/96007 A1);
no mention is made of the possible role played by such a monomer; additionally, nothing could draw attention to it, as the 5 products mentioned above appear anecdotally among the 225 tests in said documents taken together;

the polymer which is the object of the corresponding inventions is always described as water-soluble;

the examples of document WO 08/149226 A1 show an increase in the ACAV viscosity of the paper coatings, which is assumed to make the corresponding polymers unsuitable for coatings with a high solid content and/or application speed.

DETAILED DESCRIPTION OF THE PREFERRED EMBODIMENTS

The present invention more specifically relates to the implementation of certain polymer additives having the property of increasing the viscosities of coatings at a low shear gradient and of decreasing them at a high gradient, while improving the water retention of said coatings. This compromise corresponds to obtaining a coating:

that is workable (increasing the low-gradient viscosity), that can be used in high-speed or high-solids-content applications (reducing the high-gradient viscosity, in order to counterbalance the increase in the blade pressure), whose water and water-soluble substances penetrate little into the sheet of paper (this way, rheological change in the coating left unused and recycled during the application process is limited)

These additives are comb-branched non-water-soluble polymers, with a (meth)acrylic skeleton, onto which are grafted side-chains containing at least one hydrophobic monomer of the styrene or C1-C4 (meth)acrylic ester type and at least one hydroxy- or methoxy-polyalkylene glycol monomer. The monomer contents are such that said polymer is amphiphilic, as it is both rich in hydrophobic monomers and in polyalkylene glycol monomers.

However, research towards the development of a polymer capable of increasing the Brookfield™ viscosity of a paper coating and reducing its ACAV viscosity while increasing its water retention has identified a particular class of (meth) acrylic comb-branched non-water-soluble polymers, which are both rich in hydrophobic monomers of the styrene or C1-C4 acrylic ester type and rich in hydroxy- or methoxy-polyalkylene glycol monomers.

By indicating that the polymers whose use is disclosed in the present invention are non-water-soluble, the inventors mean that said polymers, as they are, meaning in acid form, are not soluble in water (unlike the polymers exemplified in the document cited above, which are water-soluble in acid form). On the other hand, once neutralized into a salt, the polymers of the present invention may become soluble in water.

Unexpectedly as it was not suggested by the aforementioned documents, and contrary to the instruction of document WO 08/149226 A1 regarding ACAV viscosity, the particular selections made by the inventors make it possible to improve the three aforementioned properties. This improvement even corresponds to a compromise heretofore under-achieved with polymers or other additives of the prior art: not only is the Brookfield™ viscosity increased here, but the ACAV viscosity of the paper coatings is also decreased, compared to the same composition containing no additive: such a result had never been achieved.

In this sense, the polymers whose use is disclosed in the present invention advantageously behave like thickening agents at a low shear gradient, and rheofluidizers at a high shear gradient. Additionally, they have proven to be very effective water-retaining agents. These results make them ideal candidates for coating processes with high solids contents and/or coat weight speeds. Only the yet-unpublished Patent Application (filing #: FR 10 52605) achieved such a result in the rheological properties of the paper coatings, but did so for higher doses, and without maintaining water-retention.

More specifically, the polymers implemented in the present invention appear in the form of aqueous dispersions of hydrophobic polymer particles. Said polymer is itself wherein it comprises, consists essentially of, and consists of, as a % of the weight of the total weight, of polymerized units of the monomers involved:

a) of 30% to 60% of a first hydroxy- and/or methoxy-polyalkylene glycol monomer, b) of 20% to 60% of a second hydrophobic monomer chosen from among styrene and (meth)acrylic esters having 1 to 4 carbon atoms, c) of 0.1% to 20% of a third carboxylic monomer chosen from among acrylic and methacrylic acids, d) of 0 to 10% of a fourth optional monomer said to be "associative", e) of 0 to 5% of a fifth optional monomer said to be "cross-linked", the sum of the % by weight of monomers a) to e) being equal to 100%.

The % of hydrophobic monomer b) above 20% particularly guarantees the novelty of the polymers implemented according to the present invention, with respect to those used in the already-cited prior art. It also contributes to the non-water-soluble nature of these additives. The % of hydroxy- and/or methoxy-polyalkylene glycol above 30% particularly guarantees the novelty of the use disclosed by the present invention, with respect to the implementation of certain latexes, and stabilized from such units (see documents EP 1 981,920 A1 and WO 94 24202 A1). The choice of all of the aforementioned %s together is what leads to novel and inventive structures, making it possible to solve the aforementioned complex technical problem in the field of paper coatings.

This, a first object of the present invention resides in the use, in a paper coating, as an agent increasing the Brookfield™ viscosity, reducing the ACAV viscosity, and as a water-retaining agent, of a non-water-soluble polymer made up of (i.e., wherein it comprises, consists essentially of, and consists of), in % by weight:

a) of 30% to 60% of at least one hydroxy- and/or methoxy-polyalkylene glycol monomer, with the formula R-$(EO)_m$-$(PO)_n$-R', where:

m and n designate integers numbers less than or equal to 150, at least one of which is non-zero, EO and PO respectively designate ethylene oxide and propylene oxide, R designates the methacrylate or methacrylurethane function, R' designates a hydroxy or methoxy group, b) of 20% to 60% of at least one hydrophobic monomer chosen from among styrene and (meth)acrylic esters having 1 to 4 carbon atoms, c) of 0.1% to 10% of at least one monomer, which is acrylic and/or methacrylic acid, d) of 0 to 5% of an associative monomer, whose formula is R-$(EO)_m$-$(PO)_n$-R", where m and n designate integers numbers less than or equal to 150, at least one of which is non-zero, EO and PO respectively designate ethylene oxide and propylene oxide, R designates the methacrylate or methacrylurethane function, R" designates an alkyl or aryl or alkylaryl group having 8 to 32 linear or branched carbon atoms, e) of 0 to 5% of a monomer having two ethylene unsaturations, the sum of % a), b), c), d), and e) being equal to 100%.

This polymer can be obtained by conventional polymerization methods, implementing known catalytic systems as described not only in the aforementioned document EP 1 981,920 A1 but also in the document EP 0 819,704 A1.

In a preferred embodiment said polymer exhibits an average molar mass by weight of between 1,000,000 and 6,000,000 g/mol, as determined by GPC. In particular, one may refer to the measurement technique described in the document WO 07/069037 A1.

Said polymer can be obtained by known methods of conventional radical copolymerization in a solution, in a direct or inverse emulsion, in suspension or precipitation in appropriate solvents, in the presence of catalytic systems and known transfer agents, or by radical mediated polymerization methods such as the method known as Reversible Addition Fragmentation Transfer (RAFT), the method known as Atom Transfer Radical Polymerization (ATRP), the method known as Nitroxide Mediated Polymerization (NMP) or the method known as Cobaloxime Mediated Free Radical Polymerization.

It is obtained in acid form, and potentially is distilled. It may also be partially or fully neutralized by one or more neutralization agents preferably chosen from sodium hydroxides and potassium hydroxides, and mixtures thereof.

A second object of the present invention relates to a paper coating containing (i.e., wherein it comprises, consists essentially of and consists of) mineral material and:
1) 3 parts to 20 parts, more preferably 5 parts to 15 parts by weight of binder, per 100 parts by dry weight of mineral material,
2) 0.1 parts to 2 parts, more preferably 0.1 to 1.5 parts by weight of polymer, per 100 parts by dry weight of mineral material,
3) water in a quantity by weight of between 20% and 80%, compared to the total weight of the paper coating, wherein said polymer is a non-water-soluble polymer made up of (i.e., wherein it comprises, consists essentially of, and consists of), expressed as a % by weight of each of the monomers:
  a) of 30% to 60% of at least one hydroxy- and/or methoxy-polyalkylene glycol monomer, with the formula R-$(EO)_m$-$(PO)_n$-R', where:
    m and n designate integers numbers less than or equal to 150, at least one of which is non-zero,
    EO and PO respectively designate ethylene oxide and propylene oxide,
    R designates the methacrylate or methacrylurethane function,
    R' designates a hydroxy or methoxy group,
  b) of 20% to 60% of a second hydrophobic monomer chosen from among styrene and (meth)acrylic esters having 1 to 4 carbon atoms,
  c) of 0.1% to 10% of at least one monomer, which is acrylic and/or methacrylic acid,
  d) of 0 to 5% of an associative monomer, whose formula is R-$(EO)_m$-$(PO)_n$-R'', where:
    m and n designate integers numbers less than or equal to 150, at least one of which is non-zero,
    EO and PO respectively designate ethylene oxide and propylene oxide,
    R designates the methacrylate or methacrylurethane function,
    R'' designates an alkyl or aryl or alkylaryl group having 8 to 32 linear or branched carbon atoms,
  e) of 0 to 5% of a monomer having two ethylene unsaturations, the sum of % a), b), c), d), and e) being equal to 100%.

A person skilled in the art may add other additives found in the normal composition of a paper coating, such as biocides, anti-foaming agents, optical brighteners, and optical brightener substrates, though without this list being exhaustive.

This coating is further wherein it contains a mineral material preferably chosen from among natural or synthetic calcium carbonate, kaolin, talc, or titanium oxide, and mixtures of these loads.

This coating is further wherein the binder is preferably chosen from among water-soluble binders, and particularly starch, or from among synthetic latex polymer binders such as styrene-acrylics and styrene-butadiene or mixtures thereof, or mixtures of these binders.

This coating is further wherein it preferably contains 20% to 35% water by weight.

The invention includes paper coated with the above coating, which can be made by art-recognized coating techniques well within the skill of the ordinary artisan.

While not limiting, the present invention includes the following preferred embodiments:

1—A polymer comprising, expressed as a % by weight of each of the monomers, polymerized units of the following monomers:
  a) 30% to 60% of at least one hydroxy- and/or methoxy-polyalkylene glycol monomer, with the formula R-$(EO)_m$-$(PO)_n$-R', where:
    m and n designate integers less than or equal to 150, at least one of which is non-zero,
    EO and PO respectively designate ethylene oxide and propylene oxide,
    R designates a methacrylate or methacrylurethane function, and
    R' designates a hydroxy or methoxy group,
  b) 20% to 60% of at least one monomer selected from the group consisting of styrene and (meth)acrylic esters having 1 to 4 carbon atoms,
  c) 0.1% to 10% of at least one of acrylic acid and methacrylic acid,
  d) 0 to 5% of a monomer whose formula is R-$(EO)_m$-$(PO)_n$-R'', where:
    m and n designate integers less than or equal to 150, at least one of which is non-zero,
    EO and PO respectively designate ethylene oxide and propylene oxide,
    R designates a methacrylate or methacrylurethane function,
    R'' designates an alkyl or aryl or alkylaryl group having 8 to 32 linear or branched carbon atoms,
  e) 0 to 5% of a monomer comprising two ethylenic unsaturations, the sum of a), b), c), d), and e) being equal to 100%, wherein said polymer is non-water-soluble in acid form.

2—The polymer according to embodiment 1, wherein said polymer has an average molar mass by weight of 1,000,000-6,000,000 g/mol, as determined by GPC.

3—The polymer according to embodiment 1, wherein said polymer is in acid form and is non-water-soluble.

4—The polymer according to embodiment 1, wherein said polymer is partially in salt form.

5—The polymer according to embodiment 4, wherein said polymer is a sodium or potassium partial salt.

6—The polymer according to embodiment 1, wherein said polymer is fully in salt form 7—The polymer according to embodiment 6, wherein said polymer is a sodium or potassium salt.

8—The polymer according to embodiment 1, comprising a positive amount of polymerized units of monomer d) of the formula R-(EO)$_m$-(PO)$_n$-R".

9—The polymer according to embodiment 1, comprising a positive amount of polymerized units of monomer e) comprising two ethylenic unsaturations.

10—The polymer according to embodiment 8, comprising a positive amount of polymerized units of monomer e) comprising two ethylenic unsaturations.

11—A paper coating composition comprising a mineral material and:
1) 3 parts to 20 parts by weight of a binder per 100 parts by dry weight of mineral material,
2) 0.1 parts to 2 parts by weight of a polymer per 100 parts by dry weight of mineral material, and
3) water in a quantity by weight of between 20% and 80%, compared to the total weight of the paper coating composition, wherein said polymer is a polymer comprising, expressed as a % by weight of each of the monomers, polymerized units of the following monomers:
a) 30% to 60% of at least one hydroxy- and/or methoxy-polyalkylene glycol monomer, with the formula R-(EO)$_m$-(PO)$_n$-R', where:
m and n designate integers less than or equal to 150, at least one of which is non-zero,
EO and PO respectively designate ethylene oxide and propylene oxide,
R designates a methacrylate or methacrylurethane function, and
R' designates a hydroxy or methoxy group,
b) 20% to 60% of at least one monomer selected from the group consisting of styrene and (meth)acrylic esters having 1 to 4 carbon atoms,
c) 0.1% to 10% of at least one of acrylic acid and methacrylic acid,
d) 0 to 5% of a monomer whose formula is R-(EO)$_m$-(PO)$_n$-R", where:
m and n designate integers less than or equal to 150, at least one of which is non-zero,
EO and PO respectively designate ethylene oxide and propylene oxide,
R designates a methacrylate or methacrylurethane function,
R" designates an alkyl or aryl or alkylaryl group having 8 to 32 linear or branched carbon atoms,
e) 0 to 5% of a monomer comprising two ethylenic unsaturations,
the sum of a), b), c), d), and e) being equal to 100%,
wherein said polymer is non-water-soluble in acid form.

12—The paper coating composition according to embodiment 11, wherein the mineral material is selected from the group consisting of natural and synthetic calcium carbonate, kaolin, talc, and mixtures thereof.

13—The paper coating composition according to embodiment 11, wherein the binder is selected from the group consisting of water-soluble binders, synthetic latex polymer binders, and mixtures of these binders.

14—The paper coating composition according to embodiment 11, comprising 20% to 35% water by weight.

15—The paper coating composition according to embodiment 11, wherein the polymer comprises a positive amount of polymerized units of monomer d) of the formula R-(EO)$_m$-(PO)$_n$-R".

16—The paper coating composition according to embodiment 11, wherein the polymer comprises a positive amount of polymerized units of monomer e) comprising two ethylenic unsaturations.

17—Paper coated with the coating composition of embodiment 11.

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A polymer comprising, expressed as a % by weight of each of the monomers, polymerized units of the following monomers:
a) 30% to 60% of at least one hydroxy- and/or methoxy-polyalkylene glycol monomer, with the formula R-(EO)$_m$-(PO)$_n$-R', where:
m and n designate integers less than or equal to 150, at least one of which is non-zero,
EO and PO respectively designate ethylene oxide and propylene oxide,
R designates a methacrylate or methacrylurethane function, and
R' designates a hydrogen radical or a methyl radical,
b) 48% to 60% of at least one monomer selected from the group consisting of styrene and (meth)acrylic esters whose ester portion has 1 to 4 carbon atoms,
c) 0.1% to 10% of at least one of acrylic acid and methacrylic acid,
d) 0 to 5% of a monomer whose formula is R-(EO)$_m$-(PO)$_n$-R", where:
m and n designate integers less than or equal to 150, at least one of which is non-zero,
EO and PO respectively designate ethylene oxide and propylene oxide,
R designates a methacrylate or methacrylurethane function,
R" designates an alkyl or aryl or alkylaryl group having 8 to 32 linear or branched carbon atoms, e) 0 to 5% of a monomer comprising two ethylenic unsaturations, the sum of a), b), c), d), and e) being equal to 100%, wherein said polymer is non-water-soluble in acid form.

2. The polymer according to claim 1, wherein said polymer has an average molar mass by weight of 1,000,000-6,000,000 g/mol, as determined by GPC.

3. The polymer according to claim 1, wherein said polymer is in acid form and is non-water-soluble.

4. The polymer according to claim 1, wherein said polymer is partially in salt form.

5. The polymer according to claim 4, wherein said polymer is a sodium or potassium partial salt.

6. The polymer according to claim 1, wherein said polymer is fully in salt form.

7. The polymer according to claim 6, wherein said polymer is a sodium or potassium salt.

8. The polymer according to claim 1, comprising a positive amount of polymerized units of monomer d) of the formula $R\text{-}(EO)_m\text{-}(PO)_n\text{-}R''$.

9. The polymer according to claim 1, comprising a positive amount of polymerized units of monomer e) comprising two ethylenic unsaturations.

10. The polymer according to claim 8, comprising a positive amount of polymerized units of monomer e) comprising two ethylenic unsaturations.

11. A paper coating composition comprising a mineral material and:
   1) 3 parts to 20 parts by weight of a binder per 100 parts by dry weight of mineral material,
   2) 0.1 parts to 2 parts by weight of a polymer per 100 parts by dry weight of mineral material, and
   3) water in a quantity by weight of between 20% and 80%, compared to the total weight of the paper coating composition,
   wherein said polymer is a polymer comprising, expressed as a % by weight of each of the monomers, polymerized units of the following monomers:
   a) 30% to 60% of at least one hydroxy- and/or methoxy-polyalkylene glycol monomer, with the formula $R\text{-}(EO)_m\text{-}(PO)_n\text{-}R'$, where:
   m and n designate integers less than or equal to 150, at least one of which is non-zero,
   EO and PO respectively designate ethylene oxide and propylene oxide,
   R designates a methacrylate or methacrylurethane function, and
   R' designates a hydrogen radical or a methyl radical,
   b) 48% to 60% of at least one monomer selected from the group consisting of styrene and (meth)acrylic esters whose ester portion has 1 to 4 carbon atoms,
   c) 0.1% to 10% of at least one of acrylic acid and methacrylic acid,
   d) 0 to 5% of a monomer whose formula is $R\text{-}(EO)_m\text{-}(PO)_n\text{-}R''$, where:
   m and n designate integers less than or equal to 150, at least one of which is non-zero,
   EO and PO respectively designate ethylene oxide and propylene oxide,
   R designates a methacrylate or methacrylurethane function,
   R'' designates an alkyl or aryl or alkylaryl group having 8 to 32 linear or branched carbon atoms,
   e) 0 to 5% of a monomer comprising two ethylenic unsaturations,
   the sum of a), b), c), d), and e) being equal to 100%,
   wherein said polymer is non-water-soluble in acid form.

12. The paper coating composition according to claim 11, wherein the mineral material is selected from the group consisting of natural and synthetic calcium carbonate, kaolin, talc, and mixtures thereof.

13. The paper coating composition according to claim 11, wherein the binder is selected from the group consisting of water-soluble binders, synthetic latex polymer binders, and mixtures of these binders.

14. The paper coating composition according to claim 11, comprising 20% to 35% water by weight.

15. The paper coating composition according to claim 11, wherein the polymer comprises a positive amount of polymerized units of monomer d) of the formula $R\text{-}(EO)_m\text{-}(PO)_n\text{-}R''$.

16. The paper coating composition according to claim 11, wherein the polymer comprises a positive amount of polymerized units of monomer e) comprising two ethylenic unsaturations.

17. Paper coated with the coating composition of claim 11.

18. The polymer according to claim 1, wherein b) is at least one monomer selected from (meth)acrylic esters whose ester portion has 1 to 4 carbon atoms.

19. The paper coating composition according to claim 11, wherein b) is at least one monomer selected from (meth)acrylic esters whose ester portion has 1 to 4 carbon atoms.

* * * * *